(12) United States Patent
Lo

(10) Patent No.: US 10,430,245 B2
(45) Date of Patent: Oct. 1, 2019

(54) SYSTEMS AND METHODS FOR DYNAMIC LOW LATENCY OPTIMIZATION

(71) Applicant: Hong Kong Applied Science and Technology Research Institute Co., Ltd., Shatin, New Territories (HK)

(72) Inventor: Chun Chung Lo, Hong Kong (HK)

(73) Assignee: Hong Kong Applied Science and Technology Research Institute Co., Ltd., Shatin (HK)

(*) Notice: Subject to any disclaimer, the term of this patent is extended or adjusted under 35 U.S.C. 154(b) by 221 days.

(21) Appl. No.: 15/469,781

(22) Filed: Mar. 27, 2017

(65) Prior Publication Data

US 2018/0276047 A1 Sep. 27, 2018

(51) Int. Cl.
*G06F 9/50* (2006.01)
*G06F 9/48* (2006.01)

(52) U.S. Cl.
CPC ............ *G06F 9/5044* (2013.01); *G06F 9/48* (2013.01); *G06F 9/505* (2013.01); *G06F 9/5055* (2013.01); *G06F 9/50* (2013.01)

(58) Field of Classification Search
None
See application file for complete search history.

(56) References Cited

U.S. PATENT DOCUMENTS 5,515,538 A * 5/1996 Kleiman ............... G06F 9/4812
710/260
8,904,403 B2 12/2014 Prathiba et al.
(Continued)

FOREIGN PATENT DOCUMENTS

CN 101226487 A 7/2008
CN 101616194 A 12/2009
(Continued)

OTHER PUBLICATIONS

International Search Report issued for PCT Application No. PCT/CN2017/080100, dated Jan. 3, 2018, 12 pages.

*Primary Examiner* — Chat C Do
*Assistant Examiner* — William C Wood
(74) *Attorney, Agent, or Firm* — Norton Rose Fulbright US LLP

(57) ABSTRACT

Systems and methods which provide low latency optimization configured to perform from the hardware layer across the operating system to an application. Low latency operation implemented in accordance with embodiments is optimized for a specific application, which interfaces with specific hardware, executing on a host processor-based system configured for low latency optimization according to the concepts herein. For example, a low latency optimization implementation may comprise various modules implemented in both the user space and Kernel space, wherein the modules cooperate to obtain information regarding the services and hardware utilized by an application and to provide such information for facilitating low latency operation with respect to the application. In operation according to embodiments, low latency operation is dynamically enabled or disabled by a low latency optimization implementation, such as to facilitate low latency operation on an application by application basis as appropriate or as desired.

26 Claims, 11 Drawing Sheets

(56) References Cited

U.S. PATENT DOCUMENTS

| | | | |
|---|---|---|---|
| 2003/0023655 A1* | 1/2003 | Sokolov | G06F 9/4881 |
| | | | 718/1 |
| 2005/0144608 A1 | 6/2005 | Oyama et al. | |
| 2009/0183027 A1* | 7/2009 | Subhraveti | G06F 9/461 |
| | | | 714/13 |
| 2011/0247010 A1* | 10/2011 | Kaiser | G06F 9/4484 |
| | | | 719/313 |
| 2014/0201357 A1 | 7/2014 | Tang et al. | |
| 2015/0143340 A1 | 5/2015 | Shin et al. | |
| 2015/0186184 A1 | 7/2015 | Kim | |
| 2016/0092259 A1* | 3/2016 | Mehta | G06F 9/45558 |
| | | | 718/1 |
| 2016/0274991 A1* | 9/2016 | Christodorescu | G06F 11/3003 |

FOREIGN PATENT DOCUMENTS

| | | |
|---|---|---|
| CN | 104090747 A | 10/2014 |
| CN | 104424034 A | 3/2015 |
| CN | 104461730 A | 3/2015 |

\* cited by examiner

SYSTEMS AND METHODS FOR DYNAMIC LOW LATENCY OPTIMIZATION

TECHNICAL FIELD

The invention relates generally to processor-based system operation and, more particularly, to dynamic low latency optimization with respect to processor-based system operation.

BACKGROUND OF THE INVENTION

The use of various forms of processor-based platforms has proliferated in recent years. For example, the use of processor-based personal communication and data processing platforms, often referred to as smartphones, has sharply increased in the last few years and is expected to continue for the foreseeable future. For example, in addition to their use in providing cellular telephone communication services, smartphones are commonly used for providing data communications, data processing, viewing and/or creating streaming media, gaming and entertainment, etc. The applications operable to provide the foregoing functionality range from applications that utilize relatively little processing power and other resources (e.g., thin clients and simple web browser applications) to applications that require significant processing power and/or resources (e.g., virtual reality (VR) and augmented reality (AR) applications, complex gaming and graphics applications, etc.).

Processing power and resources in general are limited in many current processor-based platforms, particularly mobile and battery powered processor-based platforms. For example, hardware resources, such as a central processing unit (CPU), main memory, and input/output (I/O) devices, provide appreciably limited processing, availability, and functionality in smartphone implementations. When a number of applications are run concurrently by the processor-based platform, the applications compete for the processor-based platform hardware resources. Accordingly, the performance of a processor-based system, particularly a processor-based system such as a smartphone having limited hardware resources, is generally degraded by the concurrent execution of applications. For example, multifunction operation provided by a typical smartphone executing multiple applications concurrently can result in perceptible latencies experienced by the applications.

Nevertheless, smartphones (e.g., mobile devices based upon the ANDROID operating system) and other mobile devices providing general purpose computing functionality (e.g., personal digital assistants, tablet devices, etc.) continue to experience worldwide popularity and their use has been so widely adopted as to become nearly ubiquitous. Correspondingly, the demand for applications has grown, with the types of applications available for use on these processor-based systems and their functionality and complexity also ever increasing. In particular, as the games and application market grows, the demand for low latency applications (e.g., VR, AR, audio, vehicle control, etc.) increases. The processor-based platforms and associated operating systems provided by many devices, such as smartphones and other mobile devices providing general purpose computing functionality, are not designed for low latency application execution by default. Accordingly, the user experience is often significantly impacted (e.g., the user perceives stutter in audio playback, perceptibly missing video frames, delay in data update, etc.) when such applications, which require a very strict time constraints, execute in a non-optimized operating systems.

Although some attempts at providing improvement with respect to low latency performance have been made, the existing proffered low latency techniques have heretofore been less than optimum. For example, Kernel space low latency techniques have included trimming system overhead down (e.g., remove unused modules in the Linux Kernel, such as to reduce driver load time) or implementing generic low latency Linux Kernels (e.g., using the Linux RT-patch to change the generic Linux Kernel to have a certain "real-time" ability), as may be implemented with respect to the ANDROID operating system of a smartphone. Further, a number of user space low latency techniques have been provided. For example, user space low latency techniques have included techniques to trim system overhead down (e.g., pre-disable unneeded services in the ANDROID operating system, such as to reduce background noise), various techniques for minimizing the size of the application code (e.g., using the "–O3" compile option (GNU compiler toolchain), such as to provide execution speed optimized instructions and compilation options as may lessen start-up times), or the use of well-structured coding techniques (e.g., using locking mechanisms carefully, use lesser delay/sleep, do not block callbacks, etc.).

Such low latency optimization techniques have generally been used with respect to embedded system programming and are typically applied statically to the system, applied before the application or system runs, and are not resources oriented (i.e., are not adapted to perform optimization to specific hardware or software modules). For example, the aforementioned generic low latency Linux Kernels are not optimized for execution of any particular application and often provide no significant effect when an application needs an actual low latency environment. Moreover, when such a low latency Linux Kernel is implemented in a processor-based system the low latency Kernel statically exists in that system (i.e., it is present and operating) and does not provide for dynamically enabling or disabling the low latency functionality (e.g., on an application by application basis, such as where the low latency implementation of the Kernel is not advantageous or desired with respect to one or more application). For example, the Linux RT-Patch itself does not provide dynamic features, and instead the real time options are only configurable via a configuration list (e.g., generated by text-UI based menu options selection tools) before compilation and thus none of these options are selectable after the Linux Kernel is running. With respect to the above mentioned system trim down technique, unneeded features (e.g., driver modules) are pre-removed and thus the technique is statically applied to the system. Even where seldom used features are compiled to loadable/unloadable modules to reduce the size of the resultant system, once the features of such modules are needed the loading/unloading of the modules will increase execution time.

Similarly, the user space low latency techniques are not optimized with respect to any particular application, may be statically applied, and, depending upon the resources utilized by an application, may or may not result in any significant effect on the latency experienced by the application. For example, improving executing performance by using optimized compilation options (e.g., using the "–O3" compile option of GNU compiler toolchain) is applicable during compile time and is unable to revert during runtime. Moreover, the existing user space low latency techniques are not tightly coupled with an existing Kernel space low latency technique, and thus do not provide for low latency optimization for the operating system and application combination, but rather attempt to individually and independently address latency aspects of an associated one of the operating system and application. For example, command lines able to start/stop system services may be available to developers, but these command line tools are normally not accessible by application developers. Moreover, the existing user space low latency techniques focus on application related tasks, but not the whole data path. Furthermore, the existing user space low latency techniques do not have direct access to the processor-based system hardware or information thereof, and instead interface through a hardware abstraction layer (HAL) that prevents an understanding of the particular hardware utilized by applications.

BRIEF SUMMARY OF THE INVENTION

The present invention is directed to systems and methods which provide dynamic implementation of low latency optimization configured to perform from the hardware layer up to an application (e.g., to penetrate through the operating system vertically from application level, down to the hardware level). Embodiments of a low latency optimization implementation herein are configured to allow the operating system (e.g., ANDROID operating system) to maintain native multifunction functionality while nevertheless facilitating low latency execution of applications that require a low latency environment. Low latency operation implemented in accordance with embodiments is optimized for a specific application, which interfaces with specific hardware, executing on a host processor-based system configured for low latency optimization according to the concepts herein. Although low latency operation is optimized for a specific application according to concepts of the present invention, the low latency optimization of embodiments does not target the application itself, but instead targets the user space level of the operating system (e.g., HAL, device driver frameworks, system services, etc.) for providing an environment for application execution that is optimized for low latency operation with respect to the particular application. For example, a low latency optimization implementation may comprise various modules implemented in both the user space (e.g., operating system framework) and Kernel space, wherein the modules cooperate to obtain information regarding the services and hardware utilized by an application and to provide such information for facilitating low latency operation with respect to the application.

In operation according to embodiments, low latency operation is dynamically enabled or disabled by a low latency optimization implementation, such as to facilitate low latency operation on an application by application basis as appropriate or as desired. Accordingly, logic of a low latency optimization implementation of embodiments is operable to determine whether low latency optimization is to be enabled with respect to a particular application or not. Such logic may thus dynamically enable or disable low latency operation on an application by application basis as appropriate or as desired.

A low latency optimization implementation configured according to embodiments of the present invention, such as to perform optimization from the hardware layer up to the application, comprises a multipart configuration operable to obtain information regarding the services and hardware utilized by an application and to utilize the information for providing low latency operation. For example, a low latency optimization implementation may include process resolver functionality configured to obtain information with respect to an application's use of processor-based system services and hardware and optimization engine functionality configured to perform optimization of the processor-based system for the application based upon the obtained information. The process resolver functionality and/or optimization engine functionality of embodiments may, for example, be provided as one or more modules disposed in the processor-based system operating system framework, such as within the user space thereof.

Process resolver functionality may comprise a plurality of resolver modules operable to query information regarding services and hardware utilized by an application. For example, process resolver functionality of a low latency optimization implementation of embodiments comprises user space resolver logic and Kernel space resolver logic for obtaining information regarding services and hardware utilized by an application in accordance with concepts herein.

User space resolver logic of the process resolver functionality of embodiments operates to obtain application information and information with respect to the services that are utilized by the application and provided by one or more aspect of the processor-based system hosting the application. For example, user space resolver logic may operate to obtain the name of an application and query for self-related resources by interacting with a process manager module in the processor-based system Kernel (e.g., Linux Kernel). Moreover, the user space resolver logic may locate resources from invoked operating system services (e.g., ANDROID services) by querying a service query module deployed in the operating system framework.

Kernel space resolver logic of the process resolver functionality of embodiments operates to locate resources of invoked hardware. For example, Kernel space resolver logic may utilize information regarding the application and services that are utilized by the application obtained by user space resolver logic to interact with logic of the Kernel (e.g., one or more modules disposed in the processor-based system Kernel) to determine the hardware resources utilized by the application. The interaction provided with respect to the Kernel by Kernel space resolver logic of embodiments operates to bypass a hardware abstraction layer to obtain information regarding the particular hardware utilized by applications.

Operation by process resolver functionality to obtain information with respect to an application's use of services and hardware may be provided upon initialization of the application (e.g., upon launching the application) according to embodiments of the invention. Moreover, such process resolver functionality may continue processing (e.g., operating in the background) in order to monitor any new resources allocated by the application.

Information regarding the application and services and hardware utilized by the application obtained by the process resolver functionality of embodiments may be passed to the aforementioned optimization engine functionality for implementing low latency optimization with respect to the application. Accordingly, optimization engine logic (e.g., provided as one or more modules disposed in the processor-based system operating system framework) of embodiments herein may obtain query results from the aforementioned process resolver functionality and perform optimization for the application. Such optimization may include, for example, CPU core partitioning, changing schedule policies and priorities of threads, CPU speed management, switching to use a high resolution timer, background process state control (e.g., to pause or disable unnecessary process to reduce background noise of system when a low latency mode is enabled), etc.

Optimization engine logic of embodiments of the invention is configured to remember what optimization has been implemented with respect to an application. Accordingly, optimization engine logic may operate to provide restoration processing, such as to perform system roll back to an original state prior to implementing optimization for an application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
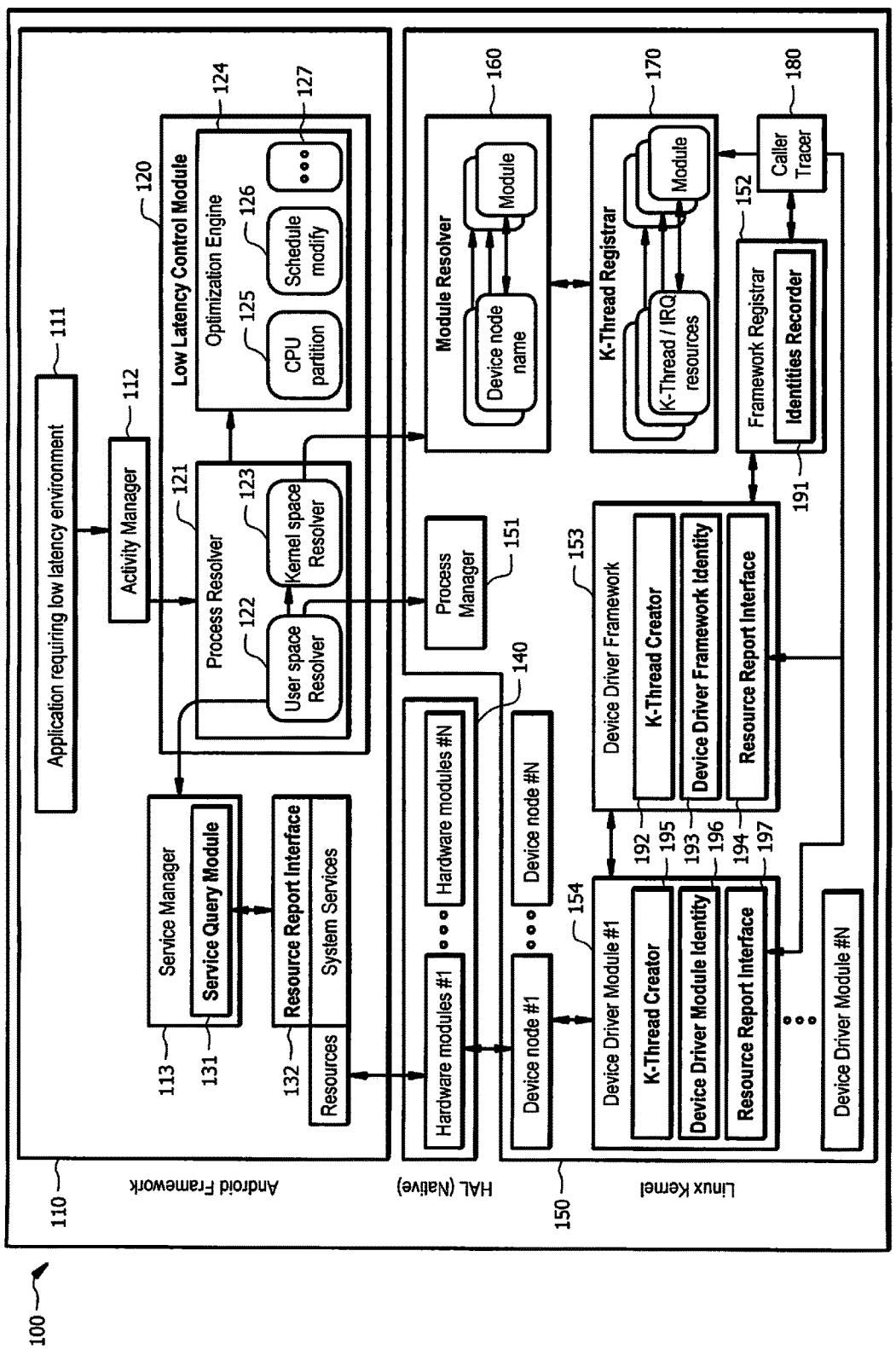
FIG. 1 shows a low latency optimization implementation for dynamically implementing low latency operation for an application according to embodiments of the invention.

FIG. 1 shows a low latency optimization implementation of embodiments comprising a multipart configuration operable to obtain information regarding the services and hardware utilized by an application and to utilize the information for providing dynamically implemented low latency operation in accordance with concepts of the present invention. In particular, FIG. 1 shows processor-based system 100 (e.g., smartphone or other device having relatively limited processing and/or other functionality) configured for low latency operation optimized for a specific application in accordance with embodiments. The low latency optimization implementation configuration shown in the embodiment of FIG. 1 comprises modules implemented in both the user space (e.g., the exemplary ANDROID framework of the illustrated embodiment) and Kernel space (e.g., the Linux Kernel of the illustrated embodiments). Various ones of the illustrated modules cooperate to obtain information regarding the services and hardware utilized by an application and to provide such information for facilitating low latency operation with respect to the application, as discussed in further detail below.

It should be appreciated that the various modules of FIG. 1, or portions thereof, may be implemented as code segments (e.g., software, firmware, and/or hardware logic) to perform the tasks and functions described herein. Such code segments may be executed by one or more processor (e.g., a CPU, an application specific integrated circuit (ASIC), a programmable gate array (PGA), one or more core processors of a multi-core processor, etc.) of processor-based system 100 to provide operation of embodiments herein. The code segments can be stored in a processor readable medium, such as may include any medium that can appropriately store the information. Examples of a processor readable medium of embodiments include an electronic circuit, a semiconductor memory device, a read only memory (ROM), a flash memory, an erasable ROM (EROM), a compact disk ROM (CD-ROM), an optical disk, a hard disk, etc.

Referring again to FIG. 1, processor-based system 100 is shown as providing an operating environment comprising user space 110 (e.g., an operating system framework, such as may comprise an ANDROID framework, providing an environment for application execution), hardware abstraction layer space 140 (e.g., a HAL as may provide simplified and abstract application programming interfaces (APIs) to allow applications to use the hardware of the host processor-based system regardless of the type of the underlying hardware), and Kernel space 150 (e.g., an operating system Kernel, such as may comprise a Linux Kernel, environment providing root or low level control within the host processor-based system). The operating environment of processor-based system 100 is configured according to concepts herein to provide a low latency environment for application execution facilitating low latency execution of applications by the processor-based system.

The low latency optimization implementation configuration shown in the embodiment of FIG. 1 comprises modules implemented in both user space 110 (e.g., the exemplary ANDROID framework of the illustrated embodiment) and Kernel space 150 (e.g., the Linux Kernel of the illustrated embodiments). In particular, the low latency optimization implementation configuration of the illustrated embodiment introduces low latency control module 120, comprising process resolver module 121 and optimization engine module 124, into user space 110. Further, the illustrated low latency optimization implementation configuration disposes services query module 131 within service manager 113 of user space 110 and correspondingly disposes resource report interface 132 in communication with system services invoked in user space 110. With regard to modules implemented in Kernel space 150, the low latency optimization implementation configuration of the illustrated embodiment introduces module resolver module 160, Kernel thread (K-thread) register module 170, and caller tracer module 180 into Kernel space 150. Additionally, the illustrated low latency optimization implementation configuration disposes identities recorder module 191 in framework registrar 152 of Kernel space 150 and correspondingly disposes K-thread creator 192, device driver framework identity 193, and resource report interface 194 in device driver framework 153 of Kernel space 150 and K-thread creator 195, device driver module identity 196, and resource report interface 197 in device driver modules (e.g., device driver module 154) of Kernel space 150. The operation and interaction of the foregoing modules to provide low latency optimization according to concepts of the present invention is described in further detail below.

In operation according to embodiments, low latency optimization processing may be triggered when an application for which a low latency environment for application execution is desired (e.g., application 111, such as may comprise a VR application, AR application, audio application, multimedia application, real-time system control application, or other application demanding low latency operation for proper operation and/or to meet user experience quality goals) is executed in user space 110. Activity manager 112 is provided to manage activity within user space 110 and in operation according to embodiments of the invention may be invoked to provide information regarding application 111 to low latency control module 120 for facilitating low latency optimization processing.

Low latency control module 120 of embodiments is operable to determine (e.g., using information regarding application 111 provided by activity manager 112) whether low latency optimization is to be provided with respect to application 111 (e.g., determining whether application 111 requires low latency optimization, determining that low latency optimization is desired for application 111, determining if low latency optimization is enabled with respect to application 111, etc.). Accordingly, low latency control module 120 of embodiments may dynamically enable or disable low latency optimization processing with respect to any particular application.

Where low latency control module 120 determines that low latency optimization is to be provided with respect to application 111, process resolver module 121 of embodiments operates to obtain information regarding the services and hardware utilized by application 111. For example, user space resolver 122 of process resolve module 121 may operate to use identification information for application 111 (e.g., the name of application 111 and/or other identifying information) to query for self-related resources (i.e., self-related resources being resources or threads created by application 111 itself, as opposed to indirect resources or threads created by system services that may be invoked by application 111) utilized by application 111 (e.g., by querying process manager 151 of Kernel space 150). Additionally, user space resolver 122 may operate to query service manager 113 of user space 110 for obtaining information with respect to the various services that are utilized by application 111 (e.g., as may include indirect resources or threads invoked by application 111).

Services query module 131 and resource report interface 132 are utilized by user space resolver 122 of the illustrated embodiment in querying for resources utilized by system services which are invoked by application 111 (i.e., resources indirectly invoked by application 111, referred to herein as indirect resources). In the embodiment illustrated in FIG. 1, services query module 131 is disposed in service manager 113 and is operable therewith to query and report indirect resources invoked by applications (e.g., application 111). Additionally, services query module 131 of embodiments is operable to control the state of services, such as to enable and/or disable services on demand (e.g., in response to control signals provided by low latency control module 120). Resource report interface 132 of the illustrated embodiment provides an interface for user space services and Kernel modules (e.g., drivers, frameworks, etc.) and is operable to provide querying and reporting with respect to resources invoked by application 111, such as may include both resources of services used by application 111 (e.g., indirect resources) and created by application 111 itself (i.e., resources directly invoked by application 111, referred to herein as self-related resources).

Kernel space resolver 123 of process resolver module 121 may operate to query one or more module of Kernel space 150 for information regarding resources invoked by application 111. For example, Kernel space resolver 123 of the illustrated embodiment may query module resolver module 160, such as using information regarding application 111 and services that are utilized by application 111 obtained by user space resolver 122, to obtain information regarding hardware resources utilized by system services which are invoked by application 111 (i.e., indirect resources comprising hardware resources indirectly invoked by application 111). Accordingly, Kernel space resolver 123 of embodiments may operate to locate resources of invoked hardware.

Module resolver module 160 of embodiments may, for example, maintain information regarding relationships between device node names and drivers. Accordingly, module resolver module 160 may handle queries from process resolver module 121 by using device node names from invoked hardware (if any) to search which device driver framework, device driver, and/or hardware modules it belongs to, such as by querying K-thread registrar 170 of the illustrated embodiment. K-thread registrar 170 may, for example, maintain one or more lists of relationships between Kernel threads and identities of device drivers (e.g., the identity of device driver module 154 denoted by device driver module identity 196) and device driver frameworks (e.g., the identity of device driver framework 153 denoted by device driver framework identity 193). It should be appreciated that, in addition to the more traditional Kernel threads, Kernel threads herein may comprise threads for interrupt handlers (e.g., where the Linux RT-patch is deployed to provide operation in which interrupt handlers become threads). In operation, device driver frameworks containing device driver modules, either or both of which may contain Kernel threads, may register to framework registrar 152 in association with their respective creation. All Kernel threads of each device driver framework (e.g., device driver framework 153) and device driver module (e.g., device driver module 154) may start from a Kernel thread creator (e.g., K-thread creator 192 and K-thread creator 195, respectively). Identities recorder 191 of framework registrar 152 of embodiments operates to maintain information regarding the relationships between Kernel thread creators and the identities of device drivers (e.g., obtained using K-thread creator 195, device driver module identity 196, and resource report interface 197) and device driver frameworks (e.g., obtained using K-thread creator 192, device driver framework identity 193, and resource report interface 194) created by a corresponding K-thread creator (e.g., K-thread creator 192 or K-thread creator 195). Caller tracer module 180 may provide a gating module of a Kernel thread create routine. In operation, caller tracer module 180 of embodiments gathers information regarding relationships between K-thread creators and the identities of device drivers and device driver frameworks from identities recorder 191. As can be appreciated from the foregoing, identities recorder 191 of embodiments provides storage for the relationships of device driver frameworks and device drivers and their corresponding K-thread creators (e.g., a one-to-one mapping wherein each device driver framework or device driver corresponds to one single K-thread creator). Additionally or alternatively, caller tracer module 180 of embodiments is operable to back-trace to identify the particular device driver framework (e.g., device driver framework 153) or device driver (e.g., device driver module 154) a K-thread creator (e.g., K-thread creator 192 or K-thread creator 195) is associated with. Caller tracer module 180 may thus obtain information regarding the hardware resources from the identified device driver framework (e.g., device driver framework 153) or device driver (e.g., device driver module 154) by using resources report interfaces 194 and 197 respectively. Caller tracer module 180 of embodiments may further output the association of such device driver framework or device driver and the corresponding resources to K-thread registrar 170 for providing information regarding the hardware resources invoked by application 111 to module resolver module 160. Caller tracer module 180 may thus operate to obtain information regarding the hardware resources utilized by system services which are invoked by the application 111 to module resolver 160 (e.g., indirect resources comprising hardware resources indirectly invoked by application 111). As can be appreciated from the foregoing, K-thread registrar 170 of embodiments provides storage for the relationships of device driver frameworks and device drivers and their corresponding resources (e.g., a one-to-many mapping wherein several resources may map to the same device driver framework or device driver because one K-thread creator may create more than one Kernel thread such that several resources (threads) may come from same device driver framework and device driver). Module resolver module 160 may report information regarding indirect resources invoked by application 111, such as to process resolver module 121 and/or optimization engine module 124, in response to the query from Kernel space resolver 123.

As can be appreciated from the foregoing, process resolver module 121 of embodiments operates to provide and/or to facilitate providing (e.g., by module resolver module 160) information regarding application 111, services, and/or hardware utilized by application 111 to optimization engine module 124 for performing low latency optimization. It should be appreciated that, after such information is provided to optimization engine module 124, process resolver module 121 of embodiments may continue to operate to perform one or more of the above described functions, such as to perform background processing to monitor for any new resources initiated by, or otherwise allocated to, application 111.

Optimization engine module 124 may implement low latency optimization with respect to application 111 using information regarding the particular services and hardware invoked by application 111, whereby the low latency optimization may be specifically tailored to application 111 and account for the whole data path associated with application 111. Low latency optimization implemented by optimization engine module 124 may, for example, include CPU core partitioning, changing schedule policies and priorities of threads, CPU speed management, switching to use high resolution timer, and background process state control such as to pause or disable unnecessary processes to reduce background noise of system when the low latency mode is enabled. In addition, optimization engine module 124 of embodiments is configured to remember what optimization has been implemented to facilitate rolling back of the optimization, such as to return the environment for application execution to an original state prior to implementing optimization for application 111.

It should be appreciated that various modifications to processor-based system 100 and/or the operating environment provided thereby may be implemented in order to facilitate or otherwise accommodate operation of embodiments of a low latency optimization implementation according to the concepts herein. For example, one or more adaptation to the operating system (e.g., deploying one or more operating system patch, optional operating system functional modules, drivers, etc.) may be made and/or one or more features may be added to the operating environment (e.g., deploying one or more resource, functionality, etc.). As an example of adaptation that may be made to the operating system, the Linux RT-patch may be deployed (e.g., to provide operation in which interrupt handlers could become threads, such as to allow changing of scheduling policies and priorities, to provide an optimized task scheduler, and to provide for spinlocks becoming mutexes, such as to eliminate "priority inversion" and to release CPU time during specific process accessing critical sections) to facilitate a generic, fundamental low latency optimization (e.g., as may be utilized in combination with one or more Kernel space and/or user space low latency optimization techniques implemented cooperatively by the low latency optimization implementation configuration). As an example of a feature that may be added to the operating environment, a high resolution timer may be deployed to accommodate low latency operation (e.g., many of the periodic tasks in the Linux Kernel are based on jiffies based timer, which generally provide timing resolution in milliseconds, and may be unable to perform in a timely manner with respect to a low latency application, whereby a high resolution timer, which may for example provide timer resolution of 1 nanosecond, may be provided to enable these periodic tasks to provide timely performance). Additional modifications to the processor-based system and/or the operating environment provided thereby may be implemented to accommodate one or more of the aforementioned adaptation to the operating system and/or feature added to the operating environment. For example, logic may be added to facilitate dynamically switching between jiffies based timer and high resolution timer utilization as a low latency optimization technique is implemented or de-implemented.

Figure 2:
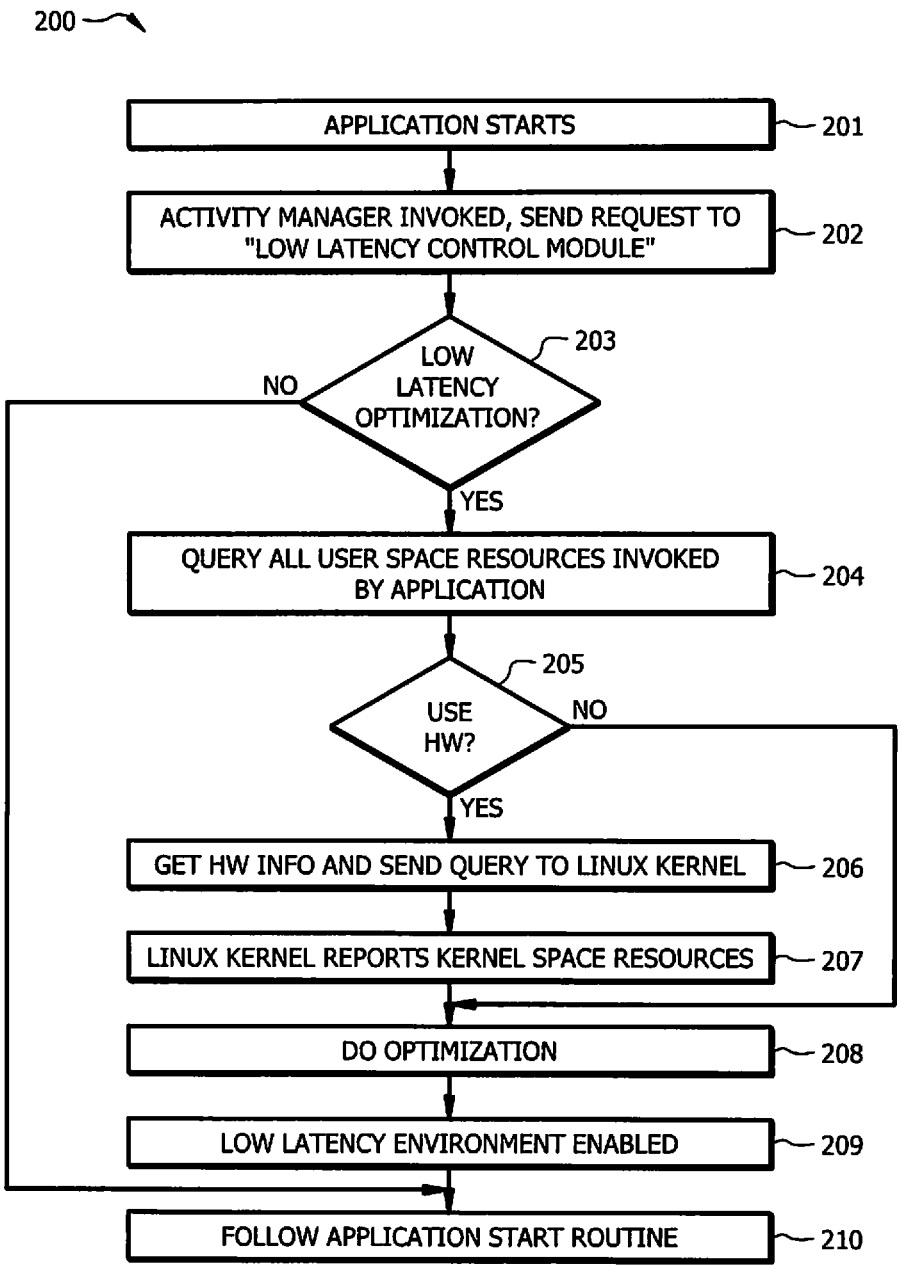
FIG. 2 shows a flow diagram of a process providing low latency optimization according to embodiments of the invention.

FIGS. 2-8 provide flow diagrams showing further detail with respect to operation of embodiments of the low latency optimization implementation configuration illustrated in FIG. 1. In particular, FIG. 2 provides a high level flow diagram showing an exemplary low latency optimization process according to embodiments. FIGS. 3-8 show further detail regarding embodiments of respective functions of the process illustrated in FIG. 2.

In operation according to flow 200 of FIG. 2, an application (e.g., application 111 of FIG. 1) for which low latency optimization may be applicable is initiated at block 201. At block 202, activity manager 112 provides a signal to initiate low latency optimization processing with respect to application 111 to low latency control module 120.

In operation according to embodiments, low latency control module 120 analyzes application 111 and/or information associated therewith, such as for determining whether low latency optimization is to be enabled or disabled for application 111. For example, low latency control module 120 may be provided the name and/or other identifying information for application 111 (collectively referred to herein as application identification information) by activity manager 112 (e.g., at block 202) for use in determining whether low latency optimization is to be enabled or disabled and/or for use in identifying resources invoked by application 111. Additionally or alternatively, low latency control module 120 of embodiments may itself obtain (e.g., as part of the processing of block 203) application identification information, or some portion thereof, for use in determining whether low latency optimization is to be enabled or disabled and/or for use in identifying resources invoked by application 111. For example, user space resolver 122 of low latency control module 120 may operate to obtain application identification information, such as from activity manager 112. Using such information, low latency control module 120 may access a database having information regarding enabling and/or disabling low latency optimization (referred to herein as low latency optimization activation information) stored in correspondence with application names and/or other identifying information for applications. Additionally or alternatively, application 111 may include, or otherwise have associated therewith, low latency optimization activation information (e.g., in a storage class, in a shared object file, such as a shared object library or dynamic link library file, provided as a user selected function call parameter, command line switch, etc.) regarding enabling and/or disabling low latency optimization for application 111. It should be appreciated that low latency optimization activation information utilized according to embodiments may comprise information regarding one or more optimizations to be implemented/not to be implemented with respect to application 111, user settings and/or preferences with respect to low latency optimization, etc., in addition to or in the alternative to information regarding enabling and/or disabling low latency optimization for application 111. Low latency control module 120 of the embodiment illustrated in FIG. 2 utilizes the application identification information and/or low latency optimization activation information at block 203 to determine if low latency optimization is to be implemented (e.g., enabled/disabled) for application 111.

Figure 3:
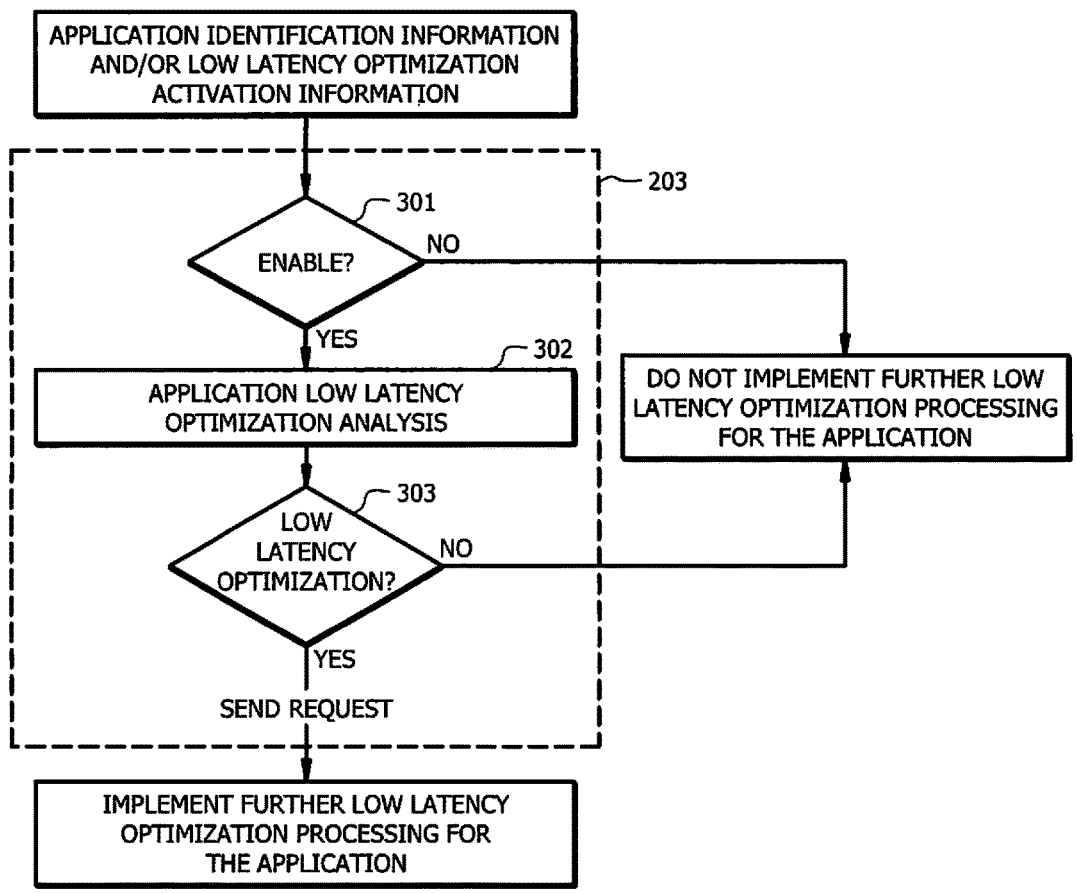
FIGS. 3-6, 7A, 7B, 8A, and 8B show further detail regarding embodiments of respective functions of the process illustrated in FIG. 2.

FIG. 3 shows further detail with respect to the functions performed at block 203 in accordance with embodiments of the invention. As shown in the example illustrated in FIG. 3, application identification information and/or low latency optimization activation information, as may be provided to or otherwise obtained by process resolver module 121, may be utilized to determine if low latency optimization is to be enabled with respect to application 111. For example, at block 301 low latency optimization activation information may be analyzed to determine if information is present affirmatively indicating that low latency optimization is to be enabled or is to be disabled, and possibly one or more low latency optimizations that are to be enabled or are not to be enabled. In operation according to an embodiment of FIG. 3, if the low latency optimization activation information includes information indicating that low latency optimization is to be disabled with respect to application 111, processing continues to proceed with the native or original application start routine (e.g., block 210 of FIG. 2) whereby further low latency optimization processing is not implemented for application 111. However, if the low latency optimization activation information includes information indicating that low latency optimization is to be enabled with respect to application 111, or does not include information definitively indicating that low latency optimization is to be enabled or disabled with respect to application 111, processing according to embodiments illustrated in FIG. 3 continues to block 302 for analysis with respect to application 111 to determine if low latency optimization is to be implemented and/or the low latency optimizations that are to be implemented.

At block 302 of embodiments of FIG. 3, application identification information may be utilized to access one or more database having low latency optimization activation information stored in correspondence with application identification information. For example, if the low latency optimization activation information analyzed at block 301 does not include information definitively indicating that low latency optimization is to be enabled or disabled, or if no low latency optimization activation information was available at block 301, low latency control module 120 of embodiments may use application identification information for application 111 to access a database having low latency optimization activation information for use determining if low latency optimization is to be enabled and/or the low latency optimizations to be enabled or disabled with respect to application 111. Even if the low latency optimization activation information utilized at block 301 includes information indicating that low latency optimization is to be enabled, processing at block 302 of embodiments of FIG. 3 may nevertheless perform further analysis with respect to application 111, such as to use application identification information for application 111 to access a database having low latency optimization activation information for use determining if low latency optimization is to be enabled with respect to application 111. For example, although a user's settings may indicate that low latency optimization is to be enabled, one or more aspect of processor-based system 100, the operating system thereof, and/or the operating environment may prevent low latency optimization or otherwise suggest low latency optimization should not be implemented for application 111. Additionally or alternatively, low latency optimization activation information obtained using application identification information checking as provided at block 302 may provide information regarding the particular low latency optimizations to be enabled and/or disabled with respect to application 111.

In operation according to embodiments at block 303, a determination may be made regarding whether the application identification information matches a database entry for which low latency optimization is to be enabled (e.g., comparing application identification information with a list of applications for which low latency optimization is to be implemented). Additionally or alternatively, low latency optimization activation information accessed using the application identification information at block 303 may be analyzed to determine if low latency optimization is to be enabled and/or one or more low latency optimizations to be enabled or disabled with respect to application 111. In operation according to an embodiment of FIG. 3, if the application identification information does not match an entry for which low latency optimization is to be enabled or if low latency optimization activation information obtained using the application identification information includes information indicating that low latency optimization is to be disabled, processing continues to proceed with the native or original application start routine (e.g., block 210 of FIG. 2) whereby further low latency optimization processing is not implemented for application 111. However, if the application identification information does match an entry for which low latency optimization is to be enabled or if low latency optimization activation information obtained using the application identification information includes information indicating that low latency optimization is to be enabled, processing according to embodiments illustrated in FIG. 3 proceeds to with further low latency optimization processing for application 111 (e.g., block 204 of FIG. 2).

Referring again to FIG. 2, where it is determined at block 203 that low latency optimization is to be enabled with respect to application 111, further low latency optimization processing for application 111 is performed. Accordingly, at block 204 of the illustrated embodiments, user space resolver 122 of process resolver module 121 provided with respect to low latency control module 120 may utilize the application identification information to query process manager 151 and/or service query module 131 of service manager 113 for self-related and indirect resources invoked by application 111. For example, user space resolver 122 may operate to query all resources of user space 110 utilized by application 111.

Figure 4:
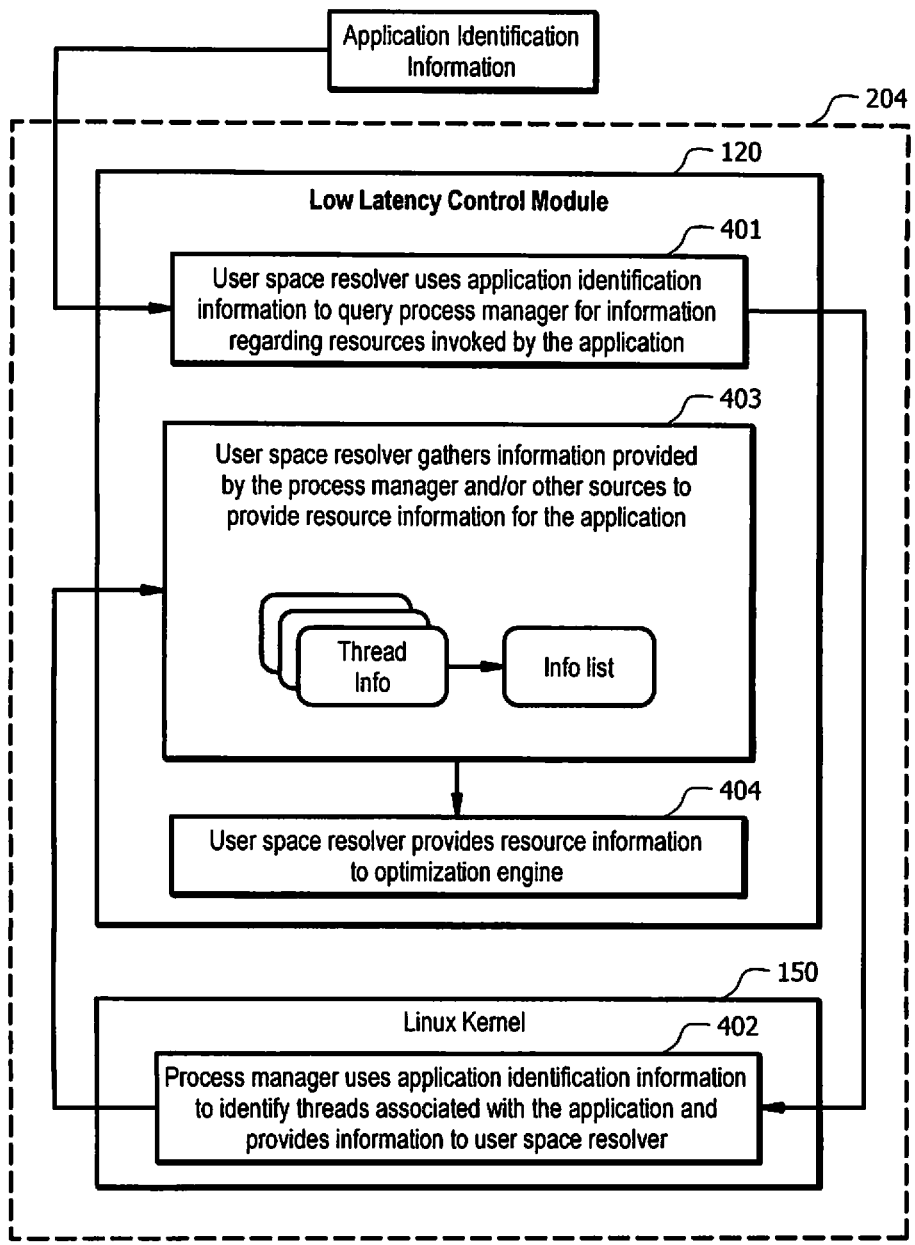

FIG. 4 shows further detail with respect to the functions performed at block 204 for querying process manager 151 of Kernel space 150 for self-related resources invoked by application 111 in accordance with embodiments of the invention. At block 401 of embodiments illustrated in FIG. 4, user space resolver 122 uses the application identification information to query process manager 151 for information regarding resources invoked by application 111. For example, the application identification information may be used to query for self-related resources, such as threads invoked by application 111 (e.g., a "Thread" class or library functions called explicitly in code, such as "Thread" class in JAVA and "pthread" in C). In response, process manager 151 may utilize the application identification information to identify resources of application 111, such as threads invoked by application 111, and provide information regarding the resources to user space resolver 122 at block 402. The information regarding resources provided to user space resolver 122 may, for example, include process (thread) IDs, names of processes (threads), status of processes (threads), etc. At block 403 of embodiments of FIG. 4, user space resolver 122 may operate to gather information provided by process manager 151 and/or other sources to provide resource information with respect to application 111. Accordingly, at block 404 of the illustrated embodiment, user space resolver 122 provides resource information with respect to application 111 to optimization engine module 124 (e.g., for implementing low latency optimization for application 111 with respect to self-related resources of application 111).

Figure 5:
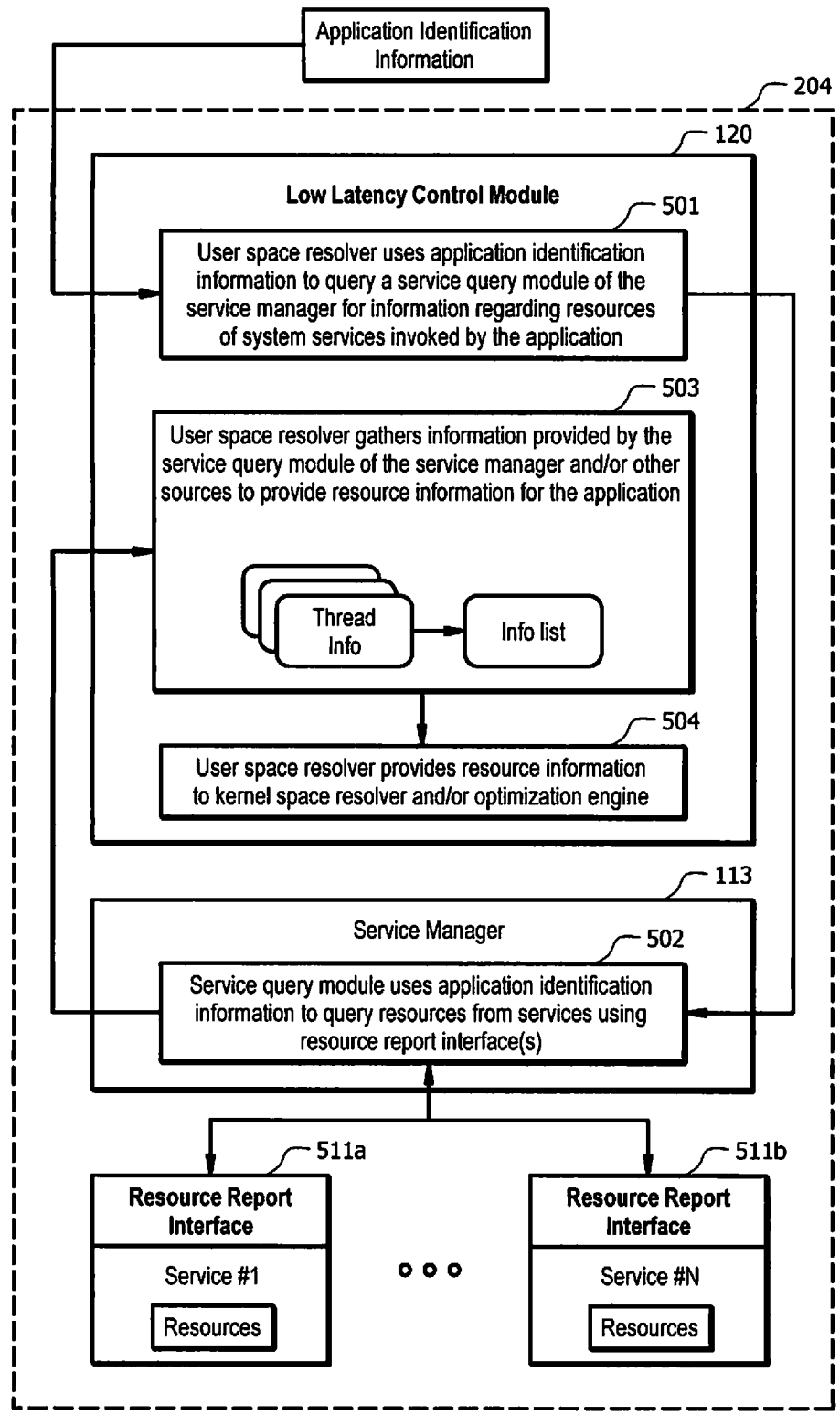

FIG. 5 shows further detail with respect to the functions performed at block 204 for querying a service manager of user space 110 for indirect resources utilized by application 111 in accordance with embodiments of the invention. At block 501 of embodiments illustrated in FIG. 5, user space resolver 122 uses the application identification information to query service manager 113 for information regarding resources invoked by application 111. However, in a conventional service manager implementation no direct technique is provided to know what threads and hardware resources of services are in the operating environment. Accordingly, services query module 131 is provided in service manager 113 of embodiments and is operable at block 502 to query resources from system services. For example, services query module 131 may utilize the application identification information to identify resources of the system services via a resource report interface (e.g., an appropriate one of resource report interfaces 511a and 511b), such as threads and other resources from system services invoked by application 111, and provide information regarding the resources to user space resolver 122 at block 502. The information regarding resources provided to user space resolver 122 may, for example, hardware information, process (thread) IDs, names of processes (threads), status of processes (threads), etc. At block 503 of embodiments of FIG. 5, user space resolver 122 may operate to gather information provided by service query module 131 of service manager 113 and/or other sources to provide resource information with respect to application 111. Accordingly, at block 504 of the illustrated embodiment, user space resolver 122 provides resource information with respect to application 111 to Kernel space resolver 123 (e.g., to facilitate querying for hardware resources utilized by system services that are invoked by application 111) and/or to optimization engine module 124 (e.g., for implementing low latency optimization for application 111 with respect to indirect resource of application 111).

Referring again to FIG. 2, processing according to the illustrated embodiment includes a determination at block 205 regarding whether indirect resources are invoked by application 111. For example, low latency control module 120 may analyze the resource information with respect to application 111 obtained by user space resolver 122 and/or the aforementioned low latency optimization activation information obtained by low latency control module 120 to determine if application 111 invokes indirect resources. It should be appreciated that, in the current ANDROID architecture, for example, applications have no direct access to hardware, and thus applications call methods provided by services in order to use hardware data (e.g., sensors, cameras, video codecs, audio codecs, etc.). Although in traditional implementations only system services could interact with the system hardware, with the services invoking corresponding HAL functionality, the low latency optimization configuration of the illustrated embodiment a resource report interface (e.g., resource report interface 132) is included to gather and report the hardware resources used by system services, whereby this information may be utilized to determine if the system service invokes hardware resources (e.g., after performing the functions performed in the example of FIG. 5, the hardware resources from system services may be obtained via service query module 131 and resource report interface 132). If it is determined that the system service does not invoke hardware resources, processing according to the illustrated embodiment continues to block 208 for operation (e.g., by optimization engine module 124) to implement low latency optimization with respect to the resources of user space 110 invoked by application 111. However, if it is determined that system service does invoke hardware resources, processing according to the illustrated embodiment continues to block 206 for operation (e.g., by process resolver module 121) to obtain information regarding the hardware resources utilized by application 111.

At block 206 of the illustrated embodiments, Kernel space resolver 123 of process resolver module 121 provided with respect to low latency control module 120 may utilize the application identification information and/or resource information with respect to application 111 provided by user space resolver 122 to query the Kernel for resources invoked by application 111. For example, Kernel space resolver 123 may operate to query module resolver module 160 for all hardware resources utilized by system services which are invoked by application 111.

Figure 6:
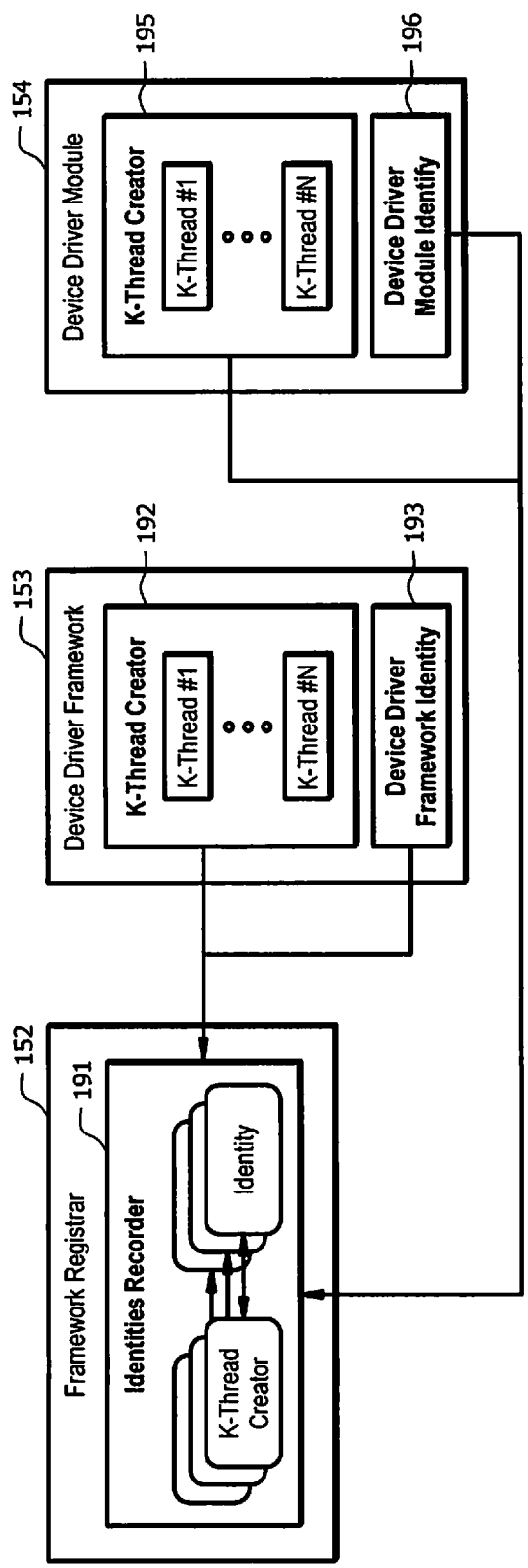

Module resolver module 160 of embodiments utilizes information regarding resources, such as device node identification information, provided by Kernel space resolver 123 in the query to obtain information regarding indirect resources invoked by application 111 at block 207. However, in a conventional Kernel implementation no direct technique is provided to report hardware resources in response to such a query. Accordingly, K-thread registrar 170 and caller tracer module 180 are provided in the Kernel, identities recorder 191 is provided in framework registrar 152 of the Kernel, K-thread creator 192, device driver framework identity 193, and resource report interface 194 are provided in device driver framework 153 of the Kernel, and K-thread creator 195, device driver module identity 196, and resource report interface 197 are provided in device driver modules (e.g., device driver module 154) of the Kernel and are operable to collect information regarding hardware resources for providing in response to queries by Kernel space resolver 123. FIGS. 6 and 7 provide detail with respect to the operation of the foregoing functional blocks to collect information regarding hardware resources according to embodiments of the invention.

FIG. 6 shows operation for collecting identities of device modules (e.g., device drivers and/or device driver frameworks) by identities recorder 191 of embodiments herein. In operation according to embodiments, during registration of each module, such as device driver or device driver framework, a K-thread creator of the respective module (e.g., K-thread creator 192 or 195) and their own identity (e.g., device driver framework identity 193 or device driver module identity 196) will be reported to identities recorder 191 shown in FIG. 1. The module identities utilized according to embodiments may, for example, comprise a string (e.g., alphanumeric string, number, name) or any other forms of values suitable for uniquely identifying the modules within the operating environment. Identities recorder 191 may operate to record the relationship of device driver identities (e.g., device driver module identity 196) and device driver framework identities (e.g., device driver framework identity 193) and their corresponding K-thread creator (e.g., K-thread creator 195 and K-thread creator 192, respectively), such as in a database of framework registrar 152 and/or elsewhere within processor-based system 100, for querying according to embodiments herein.

Figure 7A:
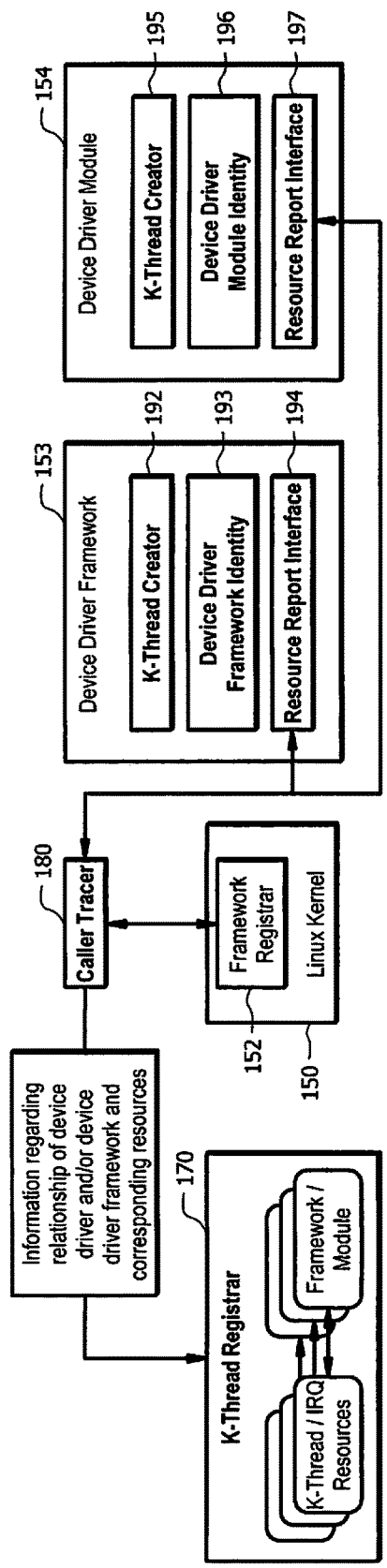
Figure 7B:
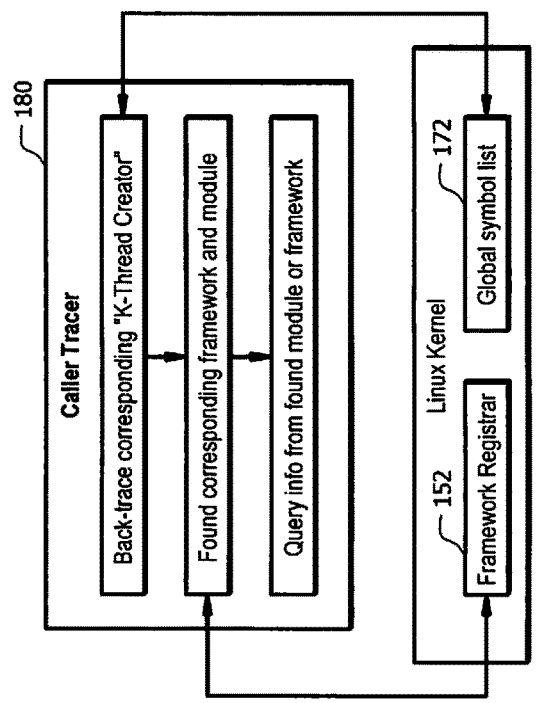

FIGS. 7A and 7B show operation for building the relationship between device driver/device driver framework and Kernel threads according to embodiments herein. In operation according to embodiments, all Kernel threads of device drivers and device driver frameworks are created via a K-thread creator (e.g., K-thread creator 192 and/or K-thread creator 195). Accordingly, caller tracer module 180 of embodiments works with one or more K-thread creators for building the relationship between device driver/device driver framework and Kernel threads. In operation according to embodiments, caller tracer module 180 may be invoked each time a Kernel thread creates. For example, when a Kernel thread is created caller tracer module 180 may be invoked for collecting information regarding the threads. When caller tracer module 180 is invoked, caller tracer module 180 may perform back-trace to find which K-thread creator the Kernel thread belongs to (e.g., caller tracer module 180 of embodiments will know the K-thread creator belongs to which device driver or device driver framework by querying identities recorder 191) and may then query resources from the found device driver (e.g., device driver module 154) or device driver framework (e.g., device driver framework 153), via corresponding resource report interface (e.g., resource report interface 194 or resource report interface 197). As an example, caller tracer module 180 may use global symbol list 172 to back-trace to find which K-thread creator created a thread. In a particular embodiment, caller tracer module 180 may, for example, obtain the caller function return address via a public built in function from GNU compiler (e.g., "_builtin_return_address( )") and calculate the actual caller function start address. The calculated function start address may then be utilized to obtain the function name by querying the global symbol list in Linux Kernel (e.g., from the "kallsyms" module). In operation of the exemplary embodiment, the function name found by caller tracer module 180 should be K-thread creator (e.g., K-thread creator 192 or K-thread creator 195) (i.e., an appropriate one of the K-thread creators of the illustrated low latency optimization configuration). Although there may be many "K-thread creators," each of them belongs to a device driver module or device driver framework according to embodiments of the invention, and thus caller tracer module 180 may locate the host of the particular "K-thread creator" by querying identities recorder 191. Accordingly, caller tracer module 180 may find the framework and module that the K-thread creator belongs to, and further query resources from the found framework or module (e.g., device driver framework 153 and/or device driver module 154). For example, caller tracer module 180 may query resources from the found module, such as using a resource report interface (e.g., resource report interface 194 or 197) thereof to report the resources (e.g., IDs of threads, status of threads, etc.). The relationship information obtained by caller tracer module 180 is thus utilized according to embodiments to obtain information regarding the indirect resources invoked by application 111 and to provide information regarding the indirect resources invoked by application 111 to module resolver module 160.

Caller tracer module 180 of embodiments operates to provide information regarding the indirect resources invoked by application 111 to K-thread registrar 170 for providing information regarding the indirect resources invoked by application 111 to module resolver module 160. Accordingly, in operation according to embodiments, module resolver module 160 may report information regarding indirect resources invoked by application 111 to process resolver module 121 and/or optimization engine module 124 at block 207 of FIG. 2.

Figure 8A:
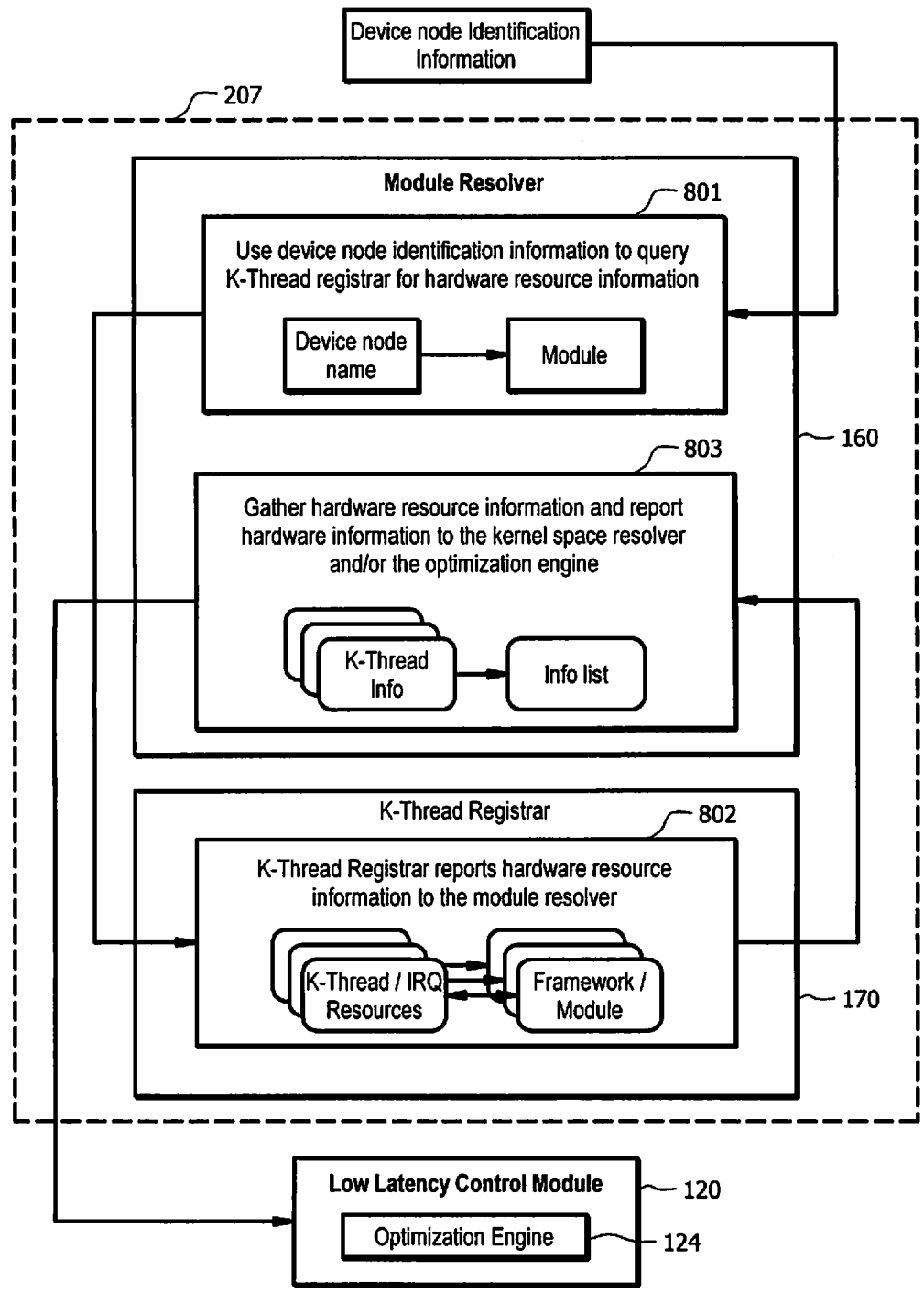
Figure 8B:
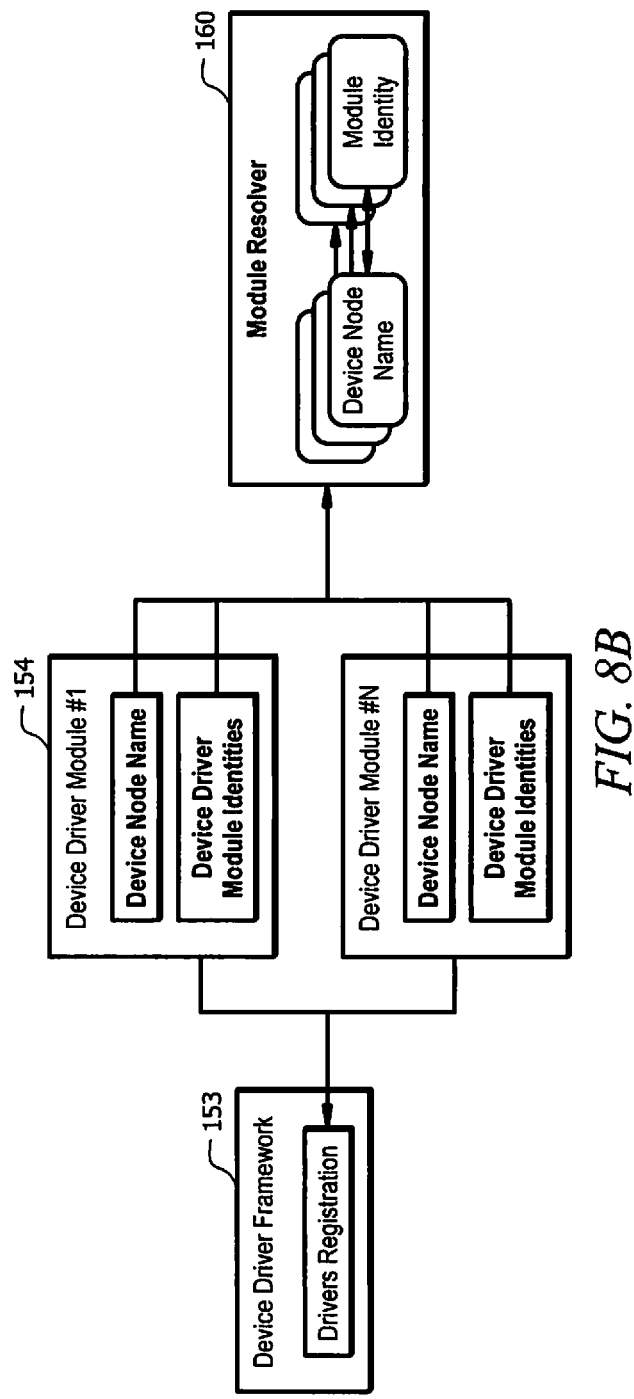

FIG. 8A shows further detail with respect to the functions performed at block 207 for providing information regarding indirect resources invoked by application 111 to process resolver module 121 and/or optimization engine module 124. Kernel space resolver 123 of embodiments may, for example, query module resolver module 160 for indirect resources invoked by application 111 using device node identification information for the device drivers invoked (e.g., as determined by user space resolver 122 querying service query module 131 of service manager 113). As shown in FIG. 8B, in operation according to embodiments, each time a driver registers to the device driver framework the driver also registers its own device node name with its own identity (e.g., using a string, such as an alphanumeric string, number, name, or any other value suitable for uniquely identifying the module within the operating environment) to module resolver module 160 to provide a device node name database for querying according to concepts herein. Accordingly, in operation according to embodiments illustrated in FIG. 8A, module resolver module 160 may use such device node identification information at block 801 to identify the corresponding device drivers and/or device driver frameworks (e.g., device driver framework 153, device driver module 154, etc.) and for querying K-thread registrar 170 for information regarding the hardware resources implicated by the device drivers or device driver frameworks. At block 802, K-thread registrar 170 of embodiments reports the resources of the identified device drivers and/or corresponding device driver frameworks to module resolver module 160. Module resolver module 160 may thus gather the indirect resource information associated with application 111 and report the relevant hardware resource information (e.g., process (thread) IDs, names of processes (threads), status of processes (threads), etc.) to Kernel space resolver 123 (e.g., to facilitate querying for hardware resources utilized by application 111) and/or to optimization engine module 124 (e.g., for implementing low latency optimization for application 111 with respect to indirect resource of application 111).

Referring again to FIG. 2, processing according to the illustrated embodiment continues to block 208 for operation (e.g., by optimization engine module 124) to implement low latency optimization with respect to the self-related and/or indirect resources invoked by application 111. For example, optimization engine module 124 of embodiments may provide control with respect to one or more modules of processor-based system 100 for configuring and/or initiating one or more low latency optimization technique appropriate for application 111, such as to implement CPU core partitioning, changing schedule policies and priorities of threads, CPU speed management, switching to use high resolution timer, background process state control, and/or the like. In operation according to embodiments, the information of a database having data regarding one or more low latency optimization techniques to be implemented with respect to particular applications (e.g., the aforementioned database storing low latency optimization activation information) may be accessible to optimization engine 124. Optimization engine module 124 of embodiments may utilize such low latency optimization activation information providing data regarding low latency optimization techniques to be implemented with respect to application 111 to selectively enable/disable the appropriate (e.g., one or more optimizations determined to be suitable for providing low latency improvement with respect to application 111, one or more optimizations determined not to be suitable for providing low latency improvement with respect to application 111, one or more optimization designated for implementing/not implementing in user settings and/or preferences with respect to application 111, etc.) low latency optimization techniques for application 111.

It should be appreciated that various low latency techniques (e.g., one or more of optimization techniques 125-127) may be enabled for providing a low latency operating environment for execution of application 111 according to embodiments of the invention. For example, the particular low latency optimization techniques implemented with respect to any specific application in accordance with embodiments herein may include existing low latency optimization techniques, such as by selectively implementing one or more of minimizing the size of application binaries (e.g., to reduce start up time and/or execution time), partitioning a CPU (e.g., to utilized all CPU cores effectively for multi-tasking and load balancing and/or to reduce context switching to allow more CPU time to be reserved for executing instructions), trimming down the system (e.g., to pre-remove useless modules and codes to reduce the size of system and lessen load up time), invoking a compilation option for speed optimized instructions (e.g., such as the "–O3" compilation option of GNU compiler toolchain, which could provide optimized instructions for the logic to execute in a more effective way), utilizing well-structured code (e.g., to improve performance), implementing lesser delay and/or lesser sleeps (e.g., to reduce CPU waiting time and make application 111 more responsive), and/or the like.

Additionally or alternatively, the particular low latency optimization techniques implemented with respect to any specific application in accordance with embodiments herein may include newly developed, possibly generally available, low latency optimization techniques, such as by selectively implementing one or more of controlling background services state control (e.g., to reduce background noise when low latency environment for application execution is enabled while allowing allow restoration to original environment in order to keep the original multi-function ability), providing a high resolution timer (e.g., to provide a timer with high level resolution, such as nanosecond level resolution, with dynamic on/off logics to allow tasks with strict time limitations to execute in a timely manner), and/or the like. Further, the particular low latency optimization techniques implemented with respect to any specific application in accordance with embodiments herein may additionally or alternatively include special purpose low latency optimization techniques, such as by selectively implementing one or more of changing scheduling policies and priorities of threads (of applications) (e.g., to optimize application 111 performance by lowering the priorities of seldom used services/threads while increasing the priorities of time critical tasks and/or to change the scheduling policies of time critical tasks to occupy more CPU time while make other non-time critical tasks to release or use less CPU time), creating different optimization profiles for different purposes (e.g., to provide different optimization profiles for audio applications to optimize for audio codec, network, and storage, for VR applications to optimize for sensors, GPU and video codec, for gesture control to optimize for cameras and GPU, and for car control to optimize for sensors, GPS, and audio codec.

Operation provided at block 208 of flow 200 of the illustrated embodiment may include implementing functionality in addition to the above described enabling/disabling low latency optimization techniques by optimization engine module 124. For example, optimization engine module 124 of embodiments may operate to record the particular optimization techniques (e.g., along with any specific configuration parameters, settings, etc.) it enables, such as to enable rolling back of the optimization. Accordingly, embodiments may utilize such information to facilitate later returning the operating environment of processor-based system 100 to a state that existed prior to implementing optimization for application 111, such as when application 111 is exited or terminated, when application 111 enters an operational state for which low latency operation is no longer needed/desired, etc.

Having provided operation to enable/disable one or more low latency optimization techniques at block 207, operation according to the illustrated embodiment proceeds to block 208 wherein the enabled one or more low latency optimization techniques are implemented. For example, in response to control signals provided by optimization engine module 124, one or more functional blocks, such as a CPU, memory controller, scheduler, sensors (e.g., gyroscope, accelerometer, compass, etc.), audio codecs, video codecs, storage, network, etc., of processor-based system 100 may implement selected low latency optimization techniques to provide a suitably low latency operating environment for execution of application 111. Thereafter, the illustrated embodiment of flow 200 proceeds to block 210 wherein the application start routine is performed to implement execution of application 111 within the low latency operating environment of processor-based system 100.

It should be appreciated that, although the various operations of flow 200 of the embodiment illustrated in FIG. 2 have been described with reference to initial execution of application 111, various of the operations described may be implemented during execution of application 111 (e.g., periodically during execution of application 111, continuously throughout execution of application 111, in response to one or more events during execution of application 111, etc.). For example, process resolver module 121 may perform one or more of the above described operations to obtain information with respect to the use of services and hardware by application 111 during its execution and provide that information to optimization engine module 124. Correspondingly, optimization engine module 124 may perform one or more of the above described operations to enable/disable one or more low latency optimization technique as then determined to be appropriate with respect to application 111.

Figure 9A:
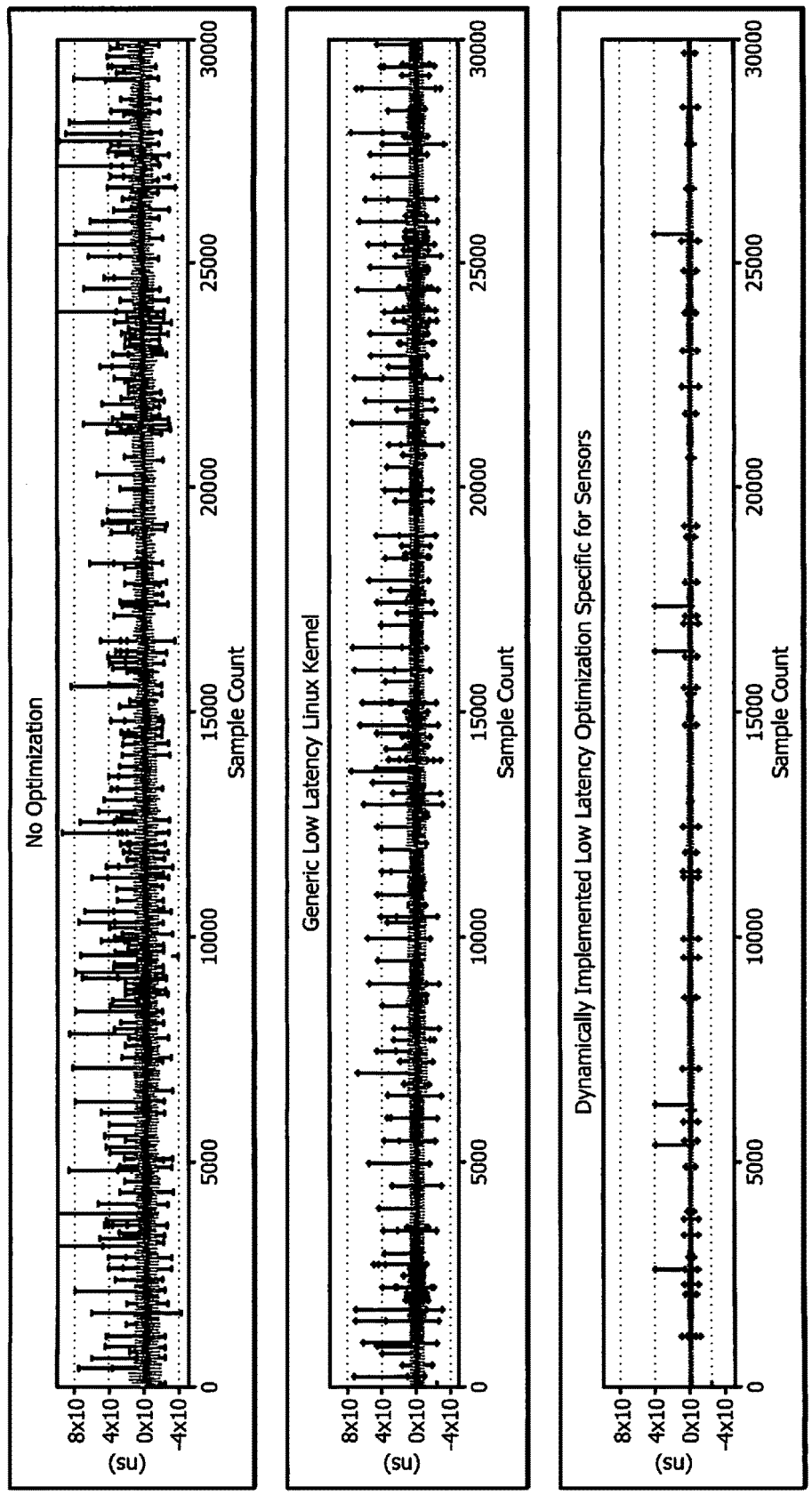
FIGS. 9A and 9B show simulated test results comparing operation with no optimization, operation using an existing generic low latency Linux Kernel, and operation using a dynamically implemented low latency optimization technique that is optimized for the particular application according to embodiments of the present invention.
Figure 9B:
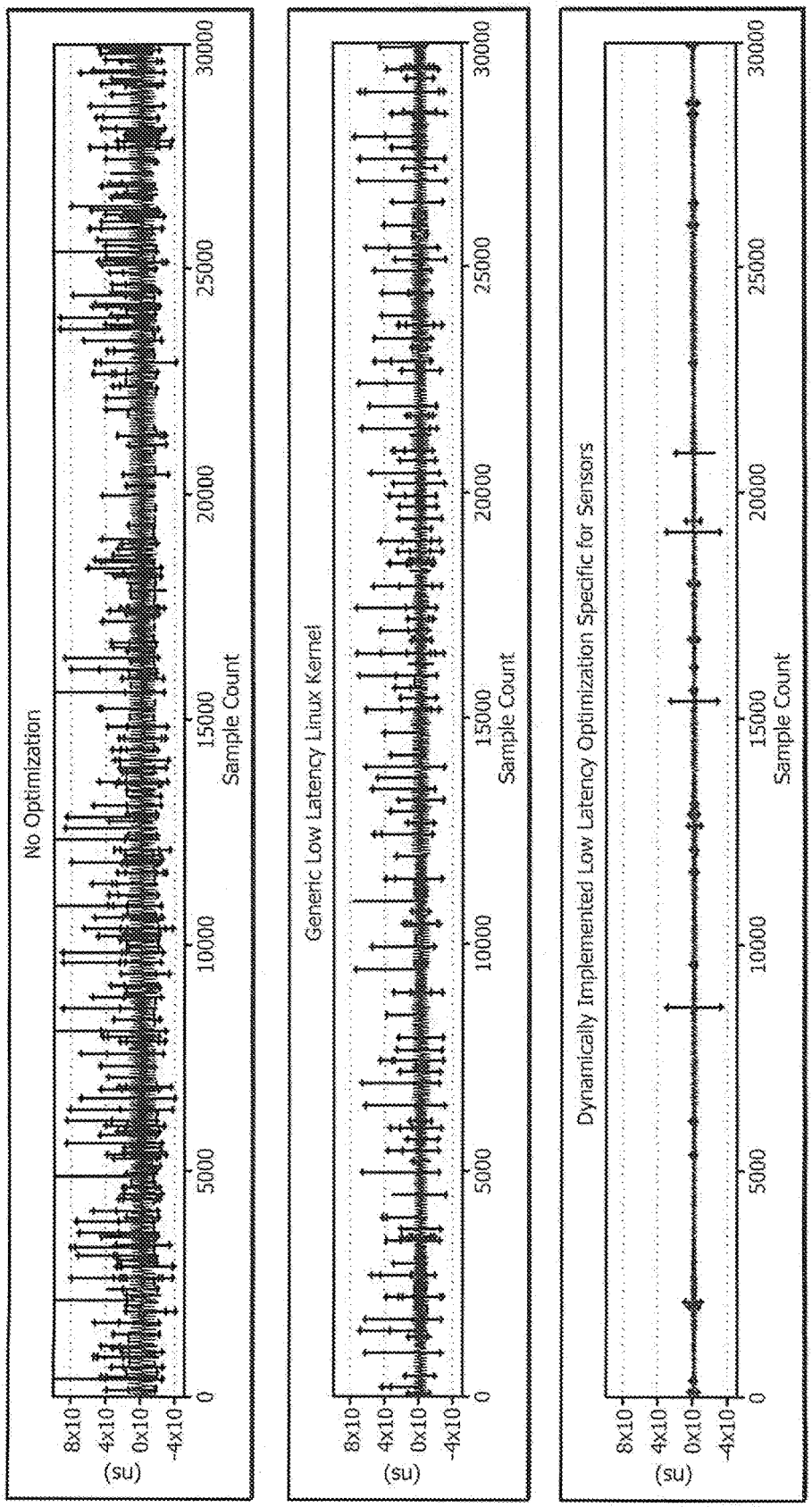

FIGS. 9A and 9B show simulated test results comparing operation with no optimization, operation using an existing generic low latency Linux Kernel, and operation using a dynamically implemented low latency optimization technique that is optimized for the particular application according to the concepts herein. The simulations of FIGS. 9A and 9B show the time differences of sensor data received in simulated operation of an InvenSense MPU6500 Six-Axis (Gyro+Accelerometer) MEMS MOTION TRACKING™ device in a test environment comprising a ROCKCHIP RK 3288 (with ARMv7 core) CPU, 2 GB DDR RAM supporting 400 MHz clock speed, Linux Kernel version 3.10.0, and the ANDROID 5.1 operating system. The simulation results shown in FIGS. 9A and 9B show the time difference within a period of time for receipt of the sensor (accelerometer in FIG. 9A and gyroscope in FIG. 9B) data determined as $t_d = t_{actual} - t_{expected}$, where $t_d$ is the time difference between actual and expected sensor data received, $t_{actual}$ is the time of sensor data actually received, and $t_{expected}$ is the time of sensor data expected to be received (e.g., 4 ms in the illustrated simulations). In the graphs of FIGS. 9A and 9B, a positive value for the time difference means the sensor data was received later than expected and a negative value for the time difference means the sensor data was received earlier than expected. Accordingly, the closer the time difference value is to 0, the more "real-time" the behavior. As can readily be seen from the graphs of the simulated results in both FIG. 9A (accelerometer) and FIG. 9B (gyroscope), the sensor data is received more consistently as real-time using low latency optimized for application 111 in according to the concepts herein than no optimization is used or generic low latency Linux Kernel optimization is used.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for dynamically implementing low latency optimization for an application in an operating environment of a processor-based system, the method comprising:
    querying user space resources invoked in a user space of the operating environment by the application for user space resource information, wherein the querying the user space resources is performed by user space resolver logic operable in the user space of the operating environment, wherein the user space resolver logic resolves application identification information for the application to collect the user space resource information including information of at least one of user space threads or system services invoked by the application, wherein the user space resolver logic comprises a connection to a native process manager operable in a Kernel space of the operating environment for querying information of user space threads created by application, and wherein the user space resolver logic comprises a connection to services query logic provided with respect to a service manager operable in the user space for gathering resources of invoked services and to provide services state control;
    determining if the application invokes one or more indirect resource of the processor-based system, wherein the one or more indirect resource of the processor-based system comprises a hardware resource utilized by system services which is invoked by the application;
    when it is determined that the application invokes one or more indirect resource, querying Kernel space resources of the Kernel space of the operating environment for hardware resource information with respect to the hardware resource utilized by system services which is invoked by the application, wherein the querying the Kernel space resources is performed by Kernel space resolver logic operable in the user space of the operating environment, and wherein the Kernel space resolver logic resolves application identification information for the application to collect the hardware resource information including Kernel space threads of hardware utilized by system services which is invoked by the application; and
    implementing one or more low latency optimization techniques to provide a low latency operating environment for the application based upon the user space resources information and, when it is determined that the application invokes one or more indirect resource, also based upon the hardware resource information.

2. The method of claim 1, wherein the determining if the application invokes one or more indirect resource is based at least in part on the user space resource information.

3. The method of claim 1, wherein at least a portion of the user space resource information obtained by the user space resolver logic in querying the user space resources is utilized by the Kernel space resolver logic in querying the Kernel space resources for the hardware resource information.

4. The method of claim 1, wherein the kernel space threads of hardware used by the application include threaded interrupt handlers.

5. The method of claim 1, wherein the services query logic comprises a connection to one or more resource report interfaces coupled to services, device driver frameworks, and device drivers, wherein the one or more resource report interfaces are configured to report allocated resources to the services query logic.

6. The method of claim 1, wherein the implementing one or more low latency optimization techniques is performed by optimization engine logic operable in the user space of the operating environment enabling one of the one or more low latency optimization techniques in accordance with the user space resource information and, when it is determined that the application invokes one or more indirect resource, also in accordance with the hardware resource information.

7. The method of claim 1, further comprising:
restoring the operating environment to operation without the one or more low latency optimization techniques after the application terminates.

8. A method for dynamically implementing low latency optimization for an application in an operating environment of a processor-based system, the method comprising:
querying user space resources invoked in a user space of the operating environment by the application for user space resource information, wherein the querying the user space resources is performed by user space resolver logic operable in the user space of the operating environment, and wherein the user space resolver logic resolves application identification information for the application to collect the user space resource information including information of at least one of user space threads or system services invoked by the application;
determining if the application invokes one or more indirect resource of the processor-based system, wherein the one or more indirect resource of the processor-based system comprises a hardware resource utilized by system services which is invoked by the application;
when it is determined that the application invokes one or more indirect resource, querying Kernel space resources of a Kernel space of the operating environment for hardware resource information with respect to the hardware resource utilized by system services which is invoked by the application, wherein the querying the Kernel space resources is performed by Kernel space resolver logic operable in the user space of the operating environment, wherein the Kernel space resolver logic resolves application identification information for the application to collect the hardware resource information including Kernel space threads of hardware utilized by system services which is invoked by the application, and wherein the querying the Kernel space resources is performed by the Kernel space resolver logic querying module resolver logic operable in the Kernel space of the operating environment using device node identification information associated with hardware resources invoked by the application, wherein the module resolver logic maintains information regarding relationships between device node identification information and device drivers and device driver frameworks for hardware resources; and
implementing one or more low latency optimization techniques to provide a low latency operating environment for the application based upon the user space resources information and, when it is determined that the application invokes one or more indirect resource, also based upon the hardware resource information.

9. The method of claim 8, wherein the information regarding relationships between device node identification information and device drivers for hardware resources is created during device driver registration.

10. The method of claim 8, wherein the module resolver logic comprises a connection to a Kernel thread registrar (K-thread registrar) comprising information regarding which Kernel threads belong to which device driver or device driver framework.

11. The method of claim 10, wherein the K-thread registrar comprises a connection to caller tracer logic configured to determine identities of device drivers or device driver frameworks calling one or more hardware resource by querying an identities recorder of a framework registrar.

12. The method of claim 11, wherein the identities recorder comprises information regarding a relationship of the identities of device drivers or device driver frameworks and corresponding Kernel thread creators (K-thread creators).

13. The method of claim 12, wherein device drivers and device driver frameworks provide their identities and corresponding K-thread creator to the identities recorder during registration.

14. The method of claim 13, wherein the one or more low latency optimization techniques comprises one or more of changing priority and scheduling policy of a thread, partitioning a central processing unit (CPU) core, switching to use a high resolution timer instead of using a jiffies-based work-queue, or controlling a state of services or processes.

15. A system for dynamically implementing low latency optimization for an application in an operating environment of a processor-based system, the system comprising:
user space resolver logic operable in a user space of the operating environment and configured to query for user space resource information regarding user space resources invoked in the user space by the application;
Kernel space resolver logic operable in the user space of the operating environment and configured to query for hardware resource information associated with Kernel space resources of a Kernel space of the operating environment indirectly invoked by the application;
optimization engine logic operable in the user space of the operating environment configured to enable one of the one or more low latency optimization techniques in accordance with the user space resource information and the hardware resource information to provide a low latency operating environment for the application based upon the user space resources information and the hardware resource information; and
low latency control logic operable in the user space of the operating environment and configured to determine if the application invokes a user space resource, wherein the low latency control logic comprises the user space resolver logic and the Kernel space resolver logic, and wherein the Kernel space resolver logic is configured to query for hardware resource information when the low latency control logic determines that the application indirectly invokes a hardware resource, wherein the low latency control logic is further configured to determine if the application indirectly invokes a hardware resource, wherein the user space resolver logic is configured to query resources of a system service via a service query module of a service manager operable in the user space and when hardware information is obtained by the query to provide the hardware information obtained in response to the query to the Kernel space resolver logic, wherein the resources of the system service contains the hardware information if that service interacts with hardware, and wherein the Kernel space resolver logic is configured to query module resolver module logic of the Kernel space to obtain at least one of a device driver identity or a device driver framework identity using the hardware information.

16. The system of claim 15, wherein the user space resource comprises at least one of a self-related user space resource directly invoked by the application or an indirect user space resource indirectly invoked by the application.

17. The system of claim 15, wherein the user space resource comprises a user space resource associated with a hardware resource indirectly invoked by the application.

18. The system of claim 15, further comprising:
service query logic provided with respect to the service manager, wherein the service query logic is configured to gather information regarding resources of services invoked by the application for providing to the user space resolver logic.

19. The system of claim 18, wherein the user space resolver logic comprises a connection to the service query logic configured for querying the information regarding resources of services invoked by the application, and wherein the user space resolver logic comprises a connection to a native process manager operable in the Kernel space configured for querying information of user space threads created by application.

20. The system of claim 19, wherein the services query logic comprises a connection to one or more resource report interfaces coupled to services, device driver frameworks, and device drivers, wherein the one or more resource report interfaces are configured to report allocated resources to the services query logic.

21. The system of claim 15, wherein the one or more low latency optimization techniques comprises one or more of changing priority and scheduling policy of a thread, partitioning a central processing unit (CPU) core, switching to use a high resolution timer instead of using a jiffies-based work-queue, or controlling a state of services or processes.

22. A system for dynamically implementing low latency optimization for an application in an operating environment of a processor-based system, the system comprising:
user space resolver logic operable in a user space of the operating environment and configured to query for user space resource information regarding user space resources invoked in the user space by the application;
Kernel space resolver logic operable in the user space of the operating environment and configured to query for hardware resource information associated with Kernel space resources of a Kernel space of the operating environment indirectly invoked by the application;
optimization engine logic operable in the user space of the operating environment configured to enable one of the one or more low latency optimization techniques in accordance with the user space resource information and the hardware resource information to provide a low latency operating environment for the application based upon the user space resources information and the hardware resource information; and
module resolver logic operable in the Kernel space of the operating environment configured to maintain information regarding relationships between device node identification information and device drivers and device driver frameworks for hardware resources and provide information regarding hardware resources indirectly invoked by the application to the Kernel space resolver logic using device node identification information associated with hardware resources indirectly invoked by the application to access information maintained by the module resolver logic.

23. The system of claim 22, further comprising:
a Kernel thread registrar (K-thread registrar) comprising information regarding which Kernel threads belong to which device driver or device driver framework, wherein the K-thread registrar is coupled to the module resolver logic and is configured to provide the information regarding which Kernel threads belong to which device driver or device driver framework in response to queries from the module resolver logic.

24. The system of claim 23, further comprising:
caller tracer logic configured to provide information regarding device drivers and device driver frameworks and corresponding resources to the K-thread registrar, wherein the caller tracer logic is configured to perform back-traces to determine Kernel thread creators (K-thread creators) that Kernel threads which invoke caller tracer logic belong to and to determine identities of a device driver or device driver framework calling one or more hardware resource by querying an identities recorder of a framework registrar coupled to the caller tracer logic using K-thread creator information.

25. The system of claim 24, wherein the identities recorder of the framework registrar is configured to maintain information regarding relationships between an identity of the device driver or device driver framework and a corresponding K-thread creator of the K-thread creators.

26. The system of claim 25, further comprising:
resource report interfaces of device drivers and device driver frameworks, wherein the resource report interfaces are configured to report resources with respect to an associated one of the device drivers and the device driver frameworks.

* * * * *